US009862281B2

(12) United States Patent
Toepler

(10) Patent No.: US 9,862,281 B2
(45) Date of Patent: Jan. 9, 2018

(54) ELECTRICAL CONNECTION LINE

(71) Applicant: Dr. Ing. h.c. F. Porsche Aktiengesellschaft, Stuttgart (DE)

(72) Inventor: Sven Toepler, Sachsenheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 150 days.

(21) Appl. No.: 14/922,422

(22) Filed: Oct. 26, 2015

(65) Prior Publication Data
US 2016/0121745 A1    May 5, 2016

(30) Foreign Application Priority Data
Oct. 29, 2014  (DE) .................... 10 2014 115 709.5

(51) Int. Cl.
| | |
|---|---|
| *H02J 7/14* | (2006.01) |
| *H01R 11/00* | (2006.01) |
| *B60L 11/18* | (2006.01) |
| *H02J 7/00* | (2006.01) |
| *H01R 11/28* | (2006.01) |

(52) U.S. Cl.
CPC ........ *B60L 11/1818* (2013.01); *H01R 11/281* (2013.01); *H02J 7/0034* (2013.01); *Y02T 10/7005* (2013.01)

(58) Field of Classification Search
CPC .... B60L 11/1818; H02J 7/0034; H01R 11/24; H01R 11/281
USPC ......................................... 320/105; 439/504
See application file for complete search history.

(56) References Cited

U.S. PATENT DOCUMENTS

| | | | | |
|---|---|---|---|---|
| 4,272,142 A | | 6/1981 | Zapf | |
| 5,599,204 A | * | 2/1997 | Glassford | .............. H01R 31/06 439/502 |
| 6,300,742 B1 | * | 10/2001 | Hung | .................... H02J 7/0034 320/103 |
| 8,325,051 B2 | * | 12/2012 | Masuda | ................ H01M 10/44 320/105 |

(Continued)

FOREIGN PATENT DOCUMENTS

| | | |
|---|---|---|
| CN | 2831524 Y | 10/2006 |
| DE | 29711556 U1 | 1/1998 |
| WO | 2014063140 A1 | 4/2014 |

OTHER PUBLICATIONS

Chinese Office Action dated Jun. 29, 2017.
French Search Report dated Sep. 8, 2017.

*Primary Examiner* — M'baye Diao
(74) *Attorney, Agent, or Firm* — Gerald E. Hespos; Michael J. Porco; Matthew T. Hespos

(57) ABSTRACT

An electrical connection line for charging an energy store of a motor vehicle has an electrical input connection (20) to connect the connection line (10) to an external energy source (24) and an electrical output connection (18) to connect the connection line (10) to the energy store (14) of the motor vehicle (12) that is to be charged. The electrical output connection (18) has a plug-in connector (18) for electrically connecting to the energy store (14) of the motor vehicle (12), and a line section (22) with at least two electrical lines for transferring electrical energy. The electrical input connection (20) has connection terminals (26, 28) to connect the connection line (10) to electrical contacts (30, 32) of the external energy source (24).

9 Claims, 1 Drawing Sheet

(56) References Cited

U.S. PATENT DOCUMENTS

| | | | |
|---|---|---|---|
| 8,749,091 B2 * | 6/2014 | Skarani | B60L 1/006 307/10.1 |
| 8,896,266 B2 * | 11/2014 | Ohtomo | B60L 3/00 320/104 |
| 9,007,015 B1 * | 4/2015 | Nook | H02J 7/0054 307/150 |
| 9,391,401 B2 | 7/2016 | Natter et al. | |
| 9,484,760 B2 * | 11/2016 | Pierson | H02J 7/0054 |
| 2004/0145340 A1 * | 7/2004 | Horenstein | H01R 11/288 320/105 |
| 2007/0285049 A1 * | 12/2007 | Krieger | H01M 2/1055 320/105 |
| 2012/0197449 A1 * | 8/2012 | Sanders | G05B 15/02 700/291 |
| 2012/0235629 A1 * | 9/2012 | Wood | H01R 11/288 320/107 |
| 2013/0241484 A1 * | 9/2013 | Kiko | B60L 3/0069 320/109 |
| 2014/0217976 A1 * | 8/2014 | McGrath | B60L 11/1837 320/109 |
| 2014/0239894 A1 * | 8/2014 | Mitsutani | H02J 7/04 320/109 |

* cited by examiner

ELECTRICAL CONNECTION LINE

CROSS REFERENCE TO RELATED APPLICATION

This application claims priority under 35 USC 119 to German Patent Appl. No. 10 2014 115 709.5 filed on Oct. 29, 2014, the entire disclosure of which is incorporated herein by reference.

BACKGROUND

1. Field of the Invention

The invention relates to an electrical connection line for charging an electrical energy store of a motor vehicle. The electrical connection line has an electrical input connection to connect the connection line to an external electrical energy source and an electrical output connection to connect the connection line to the energy store of the motor vehicle that is to be charged. The electrical output connection has a plug-in connector for electrically connecting to the energy store of the motor vehicle, and has a line section with at least two electrical lines for transferring electrical energy.

2. Description of the Related Art

Electrically driven motor vehicles usually have a traction battery that is charged using an electrical charging cable on a charging station or a static electrical socket to provide the electric vehicle with sufficient electrical drive power for driving the electrical drive.

Conventional motor vehicles or hybrid motor vehicles that break down due to a lack of fuel can be refueled with a small amount of liquid fuel. However, electric vehicles can be recharged only in the vicinity of an electrical socket or a charging station and must be towed away if the electrical energy of the traction battery has been fully consumed and no charging station or electrical socket is available.

The problem addressed by this invention is to provide an electrical connection line for electric motor vehicles that enables the electrical energy store to be charged regardless of location.

SUMMARY

The invention relates to an electrical connection line with an electrical input connection that has connection terminals to connect the connection line to electrical contacts of the external energy source. The connection terminals enable the electrical input connection to be connected to electrical contacts of any type of the electrical energy source and thus charge the electrical energy store of the motor vehicle that is to be charged. This is particularly advantageous to charge electrical energy from an assisting motor vehicle to the energy store of the motor vehicle that is seeking assistance to be charged. In this case, the electrical connection line forms an electrical connection between a battery of the assisting motor vehicle and the normal electrical charging socket of the electric vehicle seeking assistance. An electrical connection to any batteries of different vehicles can be produced using the connection terminals. Charging of the energy store of the motor vehicle regardless of location is thus possible by virtue of the electrical connection line. Thus, the problem addressed by the invention is solved completely.

The connection terminals may be designed to be connected to electrical contacts of a battery of the second motor vehicle as external energy source. As a result, simple charging of the energy store of the motor vehicle by a second motor vehicle is possible.

The plug-in connector may be designed to be connected to a charging connection socket of the energy store of the motor vehicle that is to be charged. As a result, the electrical energy store of the motor vehicle can be charged by the normal electrical connection socket so that the mobile charging process can be performed in a convenient and safe manner.

Each of the connection terminals may be connected electrically to one of the electrical lines of the line section. As a result, the probability of an incorrect polarity can be reduced.

Each of the connection terminals may be electrically connectable by a plug-in connection to a respective electrical line of the line connection. As a result, the connection terminals can be connected electrically to a conventional charging cable so that the technical complexity for providing the electrical connection line is reduced.

The connection terminals may be designed as separate connection terminals for different poles of the external energy source. As a result, an individual electrical connection is possible so that a flexible connection to different external energy sources is possible.

The connection terminals may be separate pole clips. As a result, the connection of the connection terminals to the electrical contacts of the external energy source is particularly convenient since the pole clips merely must be clamped onto the electrical contacts.

The line section is connected to a power controller unit that is connected electrically between the input connection and the output connection to control the electrical energy transferrable by the line section. As a result, the energy transferred from the external energy source to the electrical energy store of the motor vehicle can be adapted to the individual power capacity of the external energy source.

The power controller unit may be designed to limit the transferrable electrical power, thereby preventing overloading of the external energy source and, in particular, of a second assisting motor vehicle.

Overall, by virtue of the electrical connection line, the electrical energy store of an electrically driven motor vehicle can be charged regardless of location, for example by a second motor vehicle. As a result, the electrical output connection is connected to an electrical charging socket of the motor vehicle seeking assistance and the connection terminals are connected to electrical contacts of the external energy source, such as the electrical contacts of a battery of an assisting second vehicle.

The features mentioned above and still to be explained below can be used in the respectively specified combination and also in other combinations or individually without departing from the scope of the invention.

Exemplary embodiments of the invention are illustrated in the drawings and are explained in more detail in the following description.

DETAILED DESCRIPTION

Figure 1:
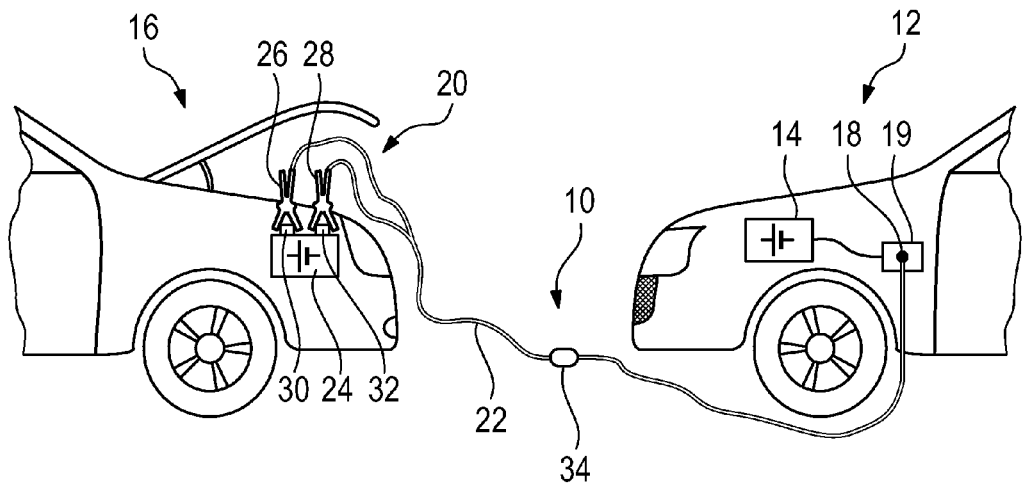
FIG. 1 is a schematic view of an electrically driven motor vehicle that is connected to a second motor vehicle by an electrical connection line.

FIG. 1 schematically illustrates an electrical connection line 10 for charging an energy store of a motor vehicle. The electrical connection line 10 is used in general to supply an electrically driven motor vehicle 12 with electrical energy to charge an electrical energy store 14 of the motor vehicle 12. The electrical connection line 10 is used in this case to form an electrical connection between an external energy source and the motor vehicle 12 where the external energy source is preferably a second motor vehicle 16.

FIG. 1 illustrates a situation in which the electrical energy of the electrical energy store 14 of the electrically driven vehicle 12 is consumed or is not sufficient to drive the electrically driven motor vehicle 12 and is charged by the motor vehicle 16 by means of the electrical connection line 10. In this situation, in general, the electrically driven motor vehicle 12 is an electric vehicle 12 seeking assistance and the motor vehicle 16 is an assisting motor vehicle 16 that may have an internal combustion engine as drive.

The electrical connection line 10 has an electrical output connection 18, namely a plug-in connector 18, and preferably a 230 V plug. The plug-in connector 18 is designed to connect electrically to a charging socket 19 of the motor vehicle 12 to charge the electrical energy store 14. The electrical connection line 10 also has an electrical input connection 20 to be connected to the external energy source. The electrical connection line 10 also has a line section 22 with at least two electrical lines that form an electrical connection between the input connection 20 and the output connection 18 to transfer electrical energy from a battery 24 of the assisting vehicle 16, as external energy source, to the electrical energy store 14 of the vehicle 12 seeking assistance. The input connection 20 has two separate connection terminals 26, 28 that are designed to be connected to electrical contacts 30, 32 of the external energy source 24 and correspondingly to transfer the electrical energy via the line section to the electrical energy store 14.

The connection terminals 26, 28 preferably are pole clips or connection clips 26, 28. Thus, the input connection 20 of the electrical connection line 10 can be connected to any electrical contacts 30, 32 of the external energy source 24 and can flexibly transfer electrical energy from different external energy sources to the electrical energy store 14 that is to be charged. Therefore, charging of the electrical energy store 14 is possible regardless of location, independently of a charging station or an electrical socket. As a result, an electrical vehicle 12 that has broken down, for example, does not need to be towed away but can be charged by another assisting motor vehicle 16 and correspondingly can be supplied with electrical energy.

Generators in conventionally driven vehicles usually provide an electrical power of approximately 3 kW and, in the event of deactivation of all auxiliary consumers, approximately 1.5 kW of electrical power is available. Thus, the electrical energy store 14 can be charged with approximately 1 kW of electrical energy, in the event that the electrically driven motor vehicle 12 consumes approximately 500 W of electricity, as shown in FIG. 1. It goes without saying that the battery 24 is connected electrically to an electric generator of the motor vehicle 16 so that electrical energy can be drawn from the connection terminals 26, 28 of the battery 24.

The electrical connection line 10 has a power controller unit 34 that is connected electrically to the line section 22 and is designed to control the electrical power that is transferred from the external energy source 24 to the electrical energy store 14 and to correspondingly limit the power capacity of the external energy source 24. As a result, it is possible to avoid overloading of the external energy source 24.

Overall, the connection terminals 26, 28 enables electrical energy to be transferred in a flexible manner to electric vehicles. Thus, the traction battery 14 of an electrically driven motor vehicle 12 that does not have sufficient electrical energy can be charged regardless of location, and it is not necessary to tow away such electric vehicles 12 that have broken down.

Figure 2:
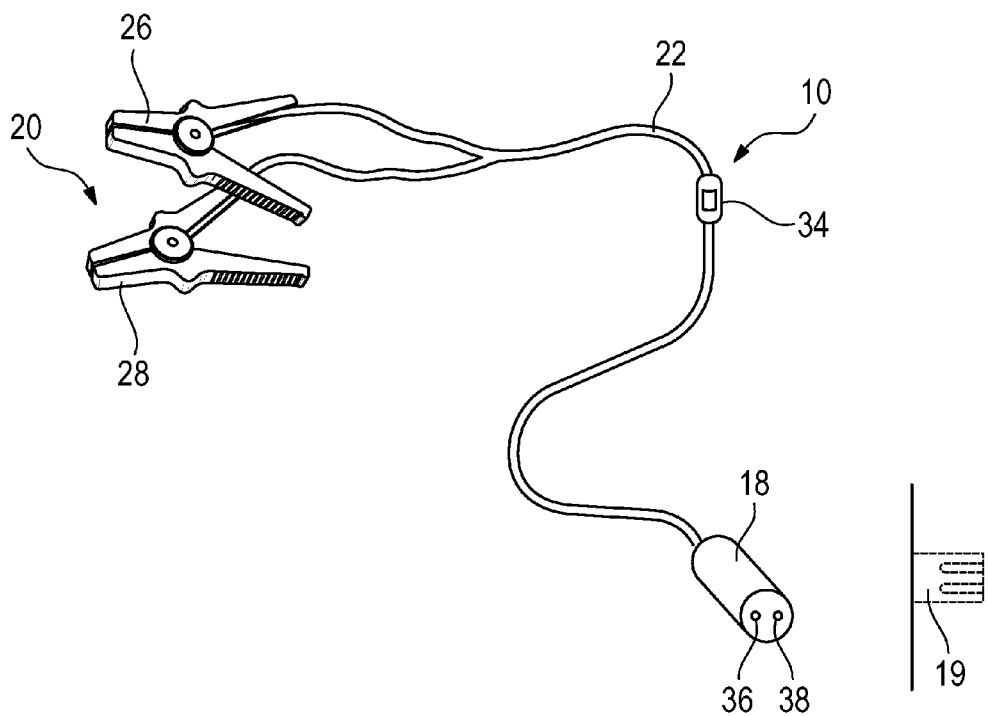
FIG. 2 is a perspective view of an electrical connection line for charging an electrical energy store of a motor vehicle.

FIG. 2 illustrates a perspective view of the electrical connection line for charging the energy store 14 of the motor vehicle 12. Identical elements are denoted by identical reference signs, wherein only the special features are explained here.

The output connection 18 is designed as plug-in charger that is electrically connectable to the charging socket 19 of the motor vehicle 12 to supply the electrical energy store 14 with electrical energy. In this case, the charging socket 19 is the charging socket that usually is used to charge the electrical energy store 14 at a charging station or an electrical socket.

In this case, the plug-in connector 18 has at least two electrical contacts 36, 38 that are connected electrically to the power controller unit 34. The plug-in connector 18 or the at least two electrical contacts 36, 38 are designed in an appropriate manner for the country in which the motor vehicle 12 is used. The two electrical lines of the line section 22 are in each case electrically connected to one of the connection terminals 26, 28. Hence, the electrical contacts 30, 32 of the external energy source 24 can be connected to the electrical contacts 36, 38 via the power controller unit 34.

The connection terminals 26, 28 are manually actuable separate pole clips or connection clips 26, 28 that are connected electrically to the two respective electrical lines of the line section 22. The pole clips 26, 28 may be connected to the electrical contacts 30, 32 and clamped onto the electrical contacts 30, 32 by an internal spring force, with the result that an electrical connection can be produced.

The pole clips 26, 28 can be connected permanently to the line section 22 or, in an alternative embodiment, can be connected to a plug connector that can be connected electrically to a corresponding socket on the line section 22. In particular, a conventional charging cable for electric vehicles can be connected to the plug connector of the pole clips 26, 28.

The power controller unit 34 is connected electrically to the two electrical lines of the line section 22 or connected between input connection 20 and output connection 19 to control and to limit the electrical energy that is transferred from the external energy source 24 to the electrical energy store 14 and to avoid overloading of the external energy source 24. The power controller unit 34 forms an in-cable control and protective device (ICCPD) or an in-cable control box. In addition, it may also be provided for converting the electrical energy, in particular a voltage conversion, for example from a DC voltage level of the assisting vehicle 16 to an AC or DC voltage level of the vehicle 12 seeking assistance.

Overall, flexible electric charging of the electrical energy store 14 of the motor vehicle 12 can be realized by virtue of the electrical connection line 10.

What is claimed is:

1. An electrical connection line for charging an electrical energy store of a motor vehicle, comprising:
    an electrical input connection to connect the connection line to an external energy source,
    an electrical output connection to connect the connection line to the energy store of the motor vehicle that is to be charged, the electrical output connection having a plug-in connector configured to be connected electrically to a charging socket of the energy store of the motor vehicle that is to be charged, and
    a line section with at least two electrical lines for transferring electrical energy, wherein
    the electrical input connection has connection terminals to connect the connection line to electrical contacts of the external energy source, the connection terminals are configured to be connected to electrical contacts of a battery of a second motor vehicle as external energy source.

2. The connection line of claim 1, wherein the connection terminals are connected electrically to the respective electrical lines of the line section.

3. The connection line of claim 1, wherein the connection terminals are electrically connectable by a plug-in connection to the respective electrical lines of the line section.

4. The connection line of claim 1, wherein the connection terminals are configured as separate connection terminals for different poles of the external energy source.

5. The connection line of claim 1, wherein the connection terminals are separate pole clips.

6. An electrical connection line for charging an electrical energy store of a motor vehicle, comprising:
    an electrical input connection to connect the connection line to an external energy source,
    an electrical output connection to connect the connection line to the energy store of the motor vehicle that is to be charged, the electrical output connection having a plug-in connector for electrically connecting to the energy store of the motor vehicle,
    a line section with at least two electrical lines for transferring electrical energy, and
    a power controller electrically connected to the line section between the input connection and the output connection to control the electrical power transferrable by the line section, wherein
    the electrical input connection has connection terminals to connect the connection line to electrical contacts of the external energy source.

7. The electrical connection line of claim 6, wherein the connection terminals are configured to be connected to electrical contacts of a battery of a second motor vehicle as external energy source.

8. The electrical connection line of claim 7, wherein the plug-in connector is configured to be connected to a charging connection socket of the energy store of the motor vehicle that is to be charged.

9. The electrical connection line of claim 6, wherein the power controller unit is designed to limit the transferrable electrical power and/or to perform a voltage conversion.

* * * * *